(12) United States Patent
Jung et al.

(10) Patent No.: US 10,241,357 B2
(45) Date of Patent: Mar. 26, 2019

(54) MOULD FRAME AND LIQUID CRYSTAL DISPLAY MODULE HAVING THEREOF

(71) Applicant: LG DISPLAY CO., LTD., Seoul (KR)

(72) Inventors: YeounJei Jung, Daegu (KR); SunHye Kang, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 557 days.

(21) Appl. No.: 14/981,048

(22) Filed: Dec. 28, 2015

(65) Prior Publication Data
US 2016/0187713 A1 Jun. 30, 2016

(30) Foreign Application Priority Data

Dec. 29, 2014 (KR) .................. 10-2014-0192384
Jul. 24, 2015 (KR) .................. 10-2015-0105365

(51) Int. Cl.
*G02F 1/1333* (2006.01)
*G02F 1/1335* (2006.01)
*F21V 8/00* (2006.01)

(52) U.S. Cl.
CPC ..... *G02F 1/133308* (2013.01); *G02B 6/0013* (2013.01); *G02B 6/0073* (2013.01); *G02F 1/133512* (2013.01); *G02F 1/133553* (2013.01); *G02F 1/133615* (2013.01); *G02F 2001/133322* (2013.01)

(58) Field of Classification Search
CPC ........ G02F 2001/133314; G02F 2001/133317; G02F 1/133308
See application file for complete search history.

(56) References Cited

U.S. PATENT DOCUMENTS

| 2011/0096569 | A1 | 4/2011 | Hamada | |
|---|---|---|---|---|
| 2011/0279748 | A1 | 11/2011 | Hasegawa | |
| 2015/0078032 | A1* | 3/2015 | Horiguchi | G02F 1/133308 362/607 |
| 2015/0124197 | A1* | 5/2015 | Yeom | G02B 6/0091 349/65 |
| 2015/0131023 | A1* | 5/2015 | Kim | G02F 1/133308 349/58 |

FOREIGN PATENT DOCUMENTS

| CN | 101191950 A | 6/2008 |
|---|---|---|
| CN | 102057209 A | 5/2011 |

* cited by examiner

*Primary Examiner* — Phu Vu
(74) *Attorney, Agent, or Firm* — Birch, Stewart, Kolasch & Birch, LLP

(57) ABSTRACT

A mold frame of a liquid crystal display module can include a body for coupling a liquid crystal display panel and a back light unit including a light emitting device (LED) array having a plurality of LED packages thereon; an extension unit extended from an upper surface of the body to cover a light source of the back light unit; and an inclined surface disposed at the extension unit for reflecting light from the light source to control an amount of the light supplied to the liquid crystal display panel.

26 Claims, 12 Drawing Sheets

MOULD FRAME AND LIQUID CRYSTAL DISPLAY MODULE HAVING THEREOF

CROSS-REFERENCE TO RELATED APPLICATION

Pursuant to 35 U.S.C. § 119(a), this application claims the benefit of earlier filing date and right of priority to Korean Patent Application No. 10-2014-0192384 and 10-2015-0105365, filed respectively on Dec. 29, 2014 and Jul. 24, 2015. The contents of all these applications are incorporated by reference herein in its entirety.

BACKGROUND OF THE INVENTION

Field of the Invention

This invention relates to a liquid crystal display module, and more particularly to a mould frame (mold frame) for preventing light leakage in a back light unit and improving durability in a slim liquid crystal display module in which a top case and a cover bottom for fixing a liquid crystal display device are not provided.

Discussion of the Related Art

In accordance with the development of a portable device such as a mobile phone and a tablet computer and information electronic equipment for displaying high resolution and high quality images such as a high resolution television, there is growing need for a flat panel display device applicable to these devices. A liquid crystal display device, a plasma display panel, and an organic light emitting display device are used as a flat panel display device. The liquid crystal display device of these flat panel display devices are mainly used recently because of a mass product technology, an easy driving means, a high resolution, and a large screen.

The liquid crystal display device is a passive transparent display device and displays the desired images on the screen by controlling amount of the light passing a liquid crystal layer with a refractive anisotropy. Thus, there is a back light unit for supplying the light to the liquid crystal layer to display the image and this back light unit may be classified into two categories according to a structure of a light source. One category is a direct type back light unit in which the light source such as a LED (Light Emitting Diode) package is disposed at the rear portion of the liquid crystal display panel to supply directly the light to the liquid crystal display panel from the lower portion. Other category is a edge type back light unit in which the LED package is disposed at the side portion of the liquid crystal display panel to supply the light to the liquid crystal display panel through a light guide plate for guiding the light to the liquid crystal display panel.

The direct type back light unit can be applicable to the liquid crystal display panel having large size and this type display panel is able to display the image of high brightness because of the direct supply of the light to the liquid crystal display panel from the LED package, so that the direct type back light unit is applied to the electronic equipment of large size such as the television.

On the contrary, since the light from the LED package at the side portion of the liquid crystal display panel is guided by the light guide plate to supply the light to the liquid crystal display panel in the edge type back light unit, it is difficult to apply to the liquid crystal display panel having large size. Further, it is also difficult to display the high brightness images, comparing to the direct type back light unit. However, since the back light unit is disposed at the side portion in the edge type back light unit, the liquid crystal display module may be thinner and the fabrication cost may be decreased.

This back light unit is coupled with the liquid crystal display panel by the mould frame to form the liquid crystal display module.

FIG. 1 is an exploded perspective view of an edge type black light unit of the liquid crystal display module according to a related art and FIG. 2 is a partially cross sectional view of the coupled liquid crystal display module according to the related art.

As shown in FIGS. 1 and 2, the related liquid crystal display module includes the liquid crystal display panel 10, the back light unit 20 for supplying the light to the liquid crystal display panel 10, and the mould frame 30 for coupling the liquid crystal display panel 10 with the back light unit 20. In particular, in this related liquid crystal display module, the liquid crystal display panel 10 and the back light unit 20 can be coupled by the mould frame 30 without a top case and a bottom case which are coupling devices of the liquid crystal display panel 10 and the back light unit 20. Thus, the coupled liquid crystal display module can be slimed.

The liquid crystal display panel 10 includes an array substrate 11 and a color filter substrate 12 to be attached for each other, and a liquid crystal layer between the array substrate 11 and the color filter substrate 12. A driving IC 15 is mounted on the array substrate 11 to receive a control signal and an image signal from a main circuit board 16. The driving IC 15 may include a data driving unit for supplying a data signal to a pixel and the driving IC 15 is connected to an outer system and a power supply.

The color filter substrate 12 is provided to display R (Red), G (Green), and B (Blue) color and a black matrix is provided to block the light passing the undesired region of the color filter substrate 12.

The back light unit 20 includes the light source 21, the light guide plate 24, optical sheets 25, and a reflector 26. The light source at the side portion of the lower portion of the liquid crystal display panel 10 includes a plurality of LED packages 22 and a LED substrate 23 on which the LED packages 22 are arranged in series.

The light guide plate 24 is disposed at the lower portion of the liquid crystal display panel 10 and the LED array 21 is facing to a light incident surface of the light guide plate 24 which is a side surface of the light guide plate 24. The light from the LED array 21 is inputted to the inside of the light guide plate 24 through the light incident surface and the incident light is reflected in the inside of the light guide plate 24 to guide the light and then the resultant light is supplied to the liquid crystal display panel 10. In order to improve the efficiency of the light, the thickness of portion corresponding to the light incident surface of the light guide plate 24 is larger than that of the light output surface of the light guide plate 24, thereby the upper surface near the light incident surface is inclined in the certain angle.

The optical sheets 25 include a diffusion sheet for diffusing the light from the light guide plate 24 and a plurality of prism sheets for correcting the light diffused by the diffusion sheet to supply the light having uniform brightness to the whole area of the liquid crystal display panel 10.

The liquid crystal display panel 10 and the back light unit 20 are coupled by the mould frame 30. The liquid crystal display panel 10 is attached to the upper surface of the mould frame 30 by a light blocking tape 45 and the back light unit 20 is disposed in the inner side of the mould frame

30. Further, the reflector 26 is disposed in the rear surface of light guide plate 24 to form the rear portion of the liquid crystal display module.

In the liquid crystal display module according to the related art, most of the light from the light source 21 is inputted to the inside of the light guide plate 24 through the light incident surface. The input light is passing within the light guide plate 124 along the longitudinal direction thereof and then outputted through the upper surface to supply into the liquid crystal display panel 10. A part of the light is not reflected at the inclined surface and then outputted to the area between the light blocking tape 25 and the optical sheets 25.

Specially, a part of the light L incident toward the optical sheets 25 is absorbed by the light blocking tape 45 and this causes the light loss. Other of the light is leaked to the outer portion through the boundary area of the light blocking tape 45 and the optical sheets 25. When the light blocking tape 45 is attached on the upper prism sheet 25a during the coupling process of the liquid crystal display module 10, the upper prism sheet 25a comes off the optical sheets 25 by the light blocking tape 45 so that the crevice is generated between the optical sheets 25 and the light L is leaked to the outer portion through the crevice.

Further, since the extra guide member over the LED package 22 is not disposed in the related liquid crystal display module, the LED package 22 may be damaged by the collision of the LED package 22 and the liquid crystal display panel 10 in the situation of the drop of the liquid crystal display module 10.

SUMMARY OF THE INVENTION

Therefore, it is an object of the invention to provide a mould frame for preventing light leakage in a back light unit and improving durability in a slim liquid crystal display module.

It is another object of the invention to provide the liquid crystal display module having the mould frame.

In order to achieve the object of the invention, the liquid crystal display module according to an embodiment of the invention comprises a liquid crystal display panel for displaying an image, a back light unit for supplying the light to the liquid crystal display panel, and a mould frame for coupling the liquid crystal display panel and the back light unit. The liquid crystal display panel is disposed at the upper surface of the mould frame. Further, a light guide plate and a LED array are disposed in the inner side of the mould frame. The liquid crystal display panel is attached at the mould frame by a black light blocking tape and the mould frame is made of white resin material.

By using the black light blocking tape, a part of the light incident to the boundary area between the light blocking tape and optical sheets from a LED package can be absorbed by the black tape, thereby the bright lines are not occurred at the edges of the screen. An inclined surface is provided in an extension unit of the mould frame so that the amount of the light incident to the boundary area between the light blocking tape and optical sheets can be controlled by the incline angle of the inclined surface, thereby the brightness at an edge corresponding to a light incident surface of the light guide plate is not decreased.

In one or more embodiments of this invention, the bright line is not occurred in the edges by using the black light blocking tape and the brightness at all the edges is equal by controlling the light reflection from the inclined surface of the extension unit of the white mould frame, thereby the brightness at the edges may be same as the central region of the screen.

Further, in one or more embodiments of this invention, since a LED fixing unit is formed in the extension unit of the mould frame, the mould frame is not moved when the LED array is coupled and thus the defects caused by the assembling error can be prevented. The LED fixing unit includes a fixing member extended vertically from the LED substrate and a guide member having a curved surface of a certain curvature at the end portion of the fixing member. When the LED array is coupled, the LED array is fixed by the fixing member. If the assembling error is occurred, the LED package is contacted with the curved surface of the guide member and moving slidingly along the curved surface into the set position.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE EMBODIMENTS

Hereinafter, the present invention will be described in detail with reference to the accompanying drawings.

Figure 3:
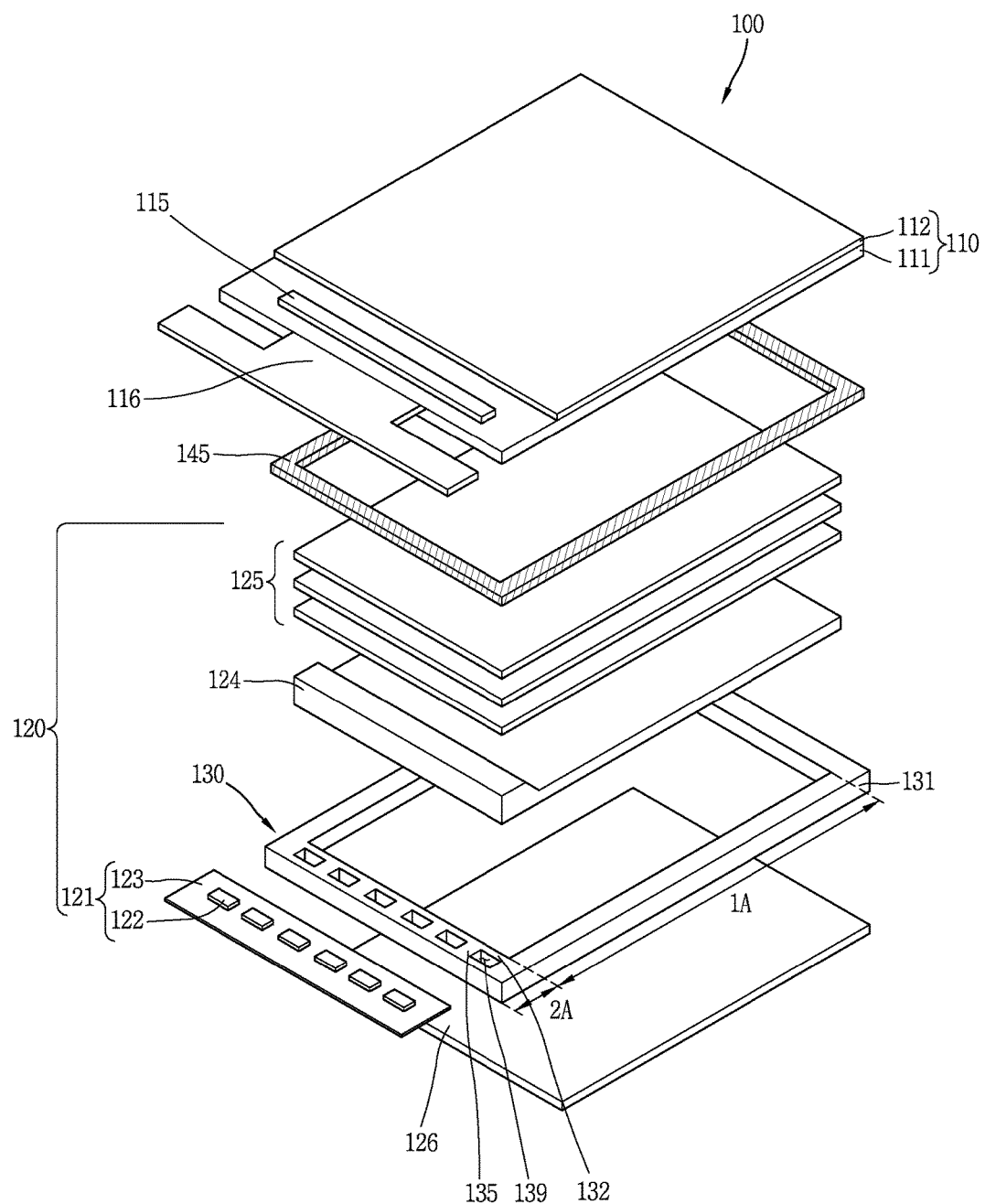
FIG. 3 is an exploded perspective view of a liquid crystal display module according to a first embodiment of the invention.
Figure 4:
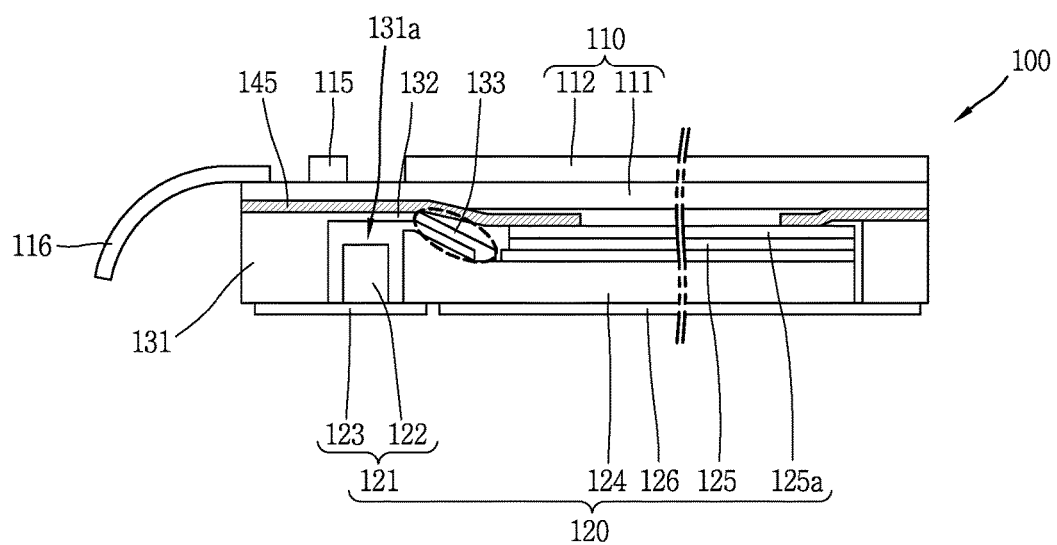
FIG. 4 is a cross sectional view of the liquid crystal display module according to the first embodiment of the invention.

FIG. 3 is an exploded perspective view of a liquid crystal display module having the mould frame and the FIG. 4 is a cross sectional view of the coupled liquid crystal display module according to the first embodiment of the invention. All the components of the liquid crystal display module and a device having the module according to all the embodiments of the present invention are operatively coupled and configured. Further, an LED below can represent a light emitting diode or a light emitting device.

As shown in FIGS. 3 and 4, the liquid crystal display module 100 according to the first embodiment of the invention comprises a liquid crystal display panel 110, a back light unit 120 at the rear side of the liquid crystal display panel 110, and a mould frame for mounting and coupling the liquid crystal display panel 110 and the back light unit 120. In this embodiment, a top case and a bottom cover, which are used for coupling and fixing the liquid crystal device panel 110 and the back light unit 120 in the related art, not provided and only the mould frame 130 is provided to couple the liquid crystal display device panel 110 and the back light unit 120, so that the coupled liquid crystal display module can be slimed.

The liquid crystal display panel 110 includes the array substrate 111 and the color filter substrate 112 which are apart in certain distance and attached for each other, and the liquid crystal layer between the array substrate 111 and the color filter substrate 112. In the one side of the array substrate 111, the driving IC 115 is mounted and the main circuit board 116 is attached.

A thin film transistor which is a switching element, the various conductive lines, and pixel electrodes are disposed on the array substrate 111. On the color filter substrate 112, a color filter layer for displaying the Red, Green, and Blue colors and a black matrix for blocking the light passing through the undesired region are disposed. Further, a gate driving unit may be formed in the GIP (Gate In Panel) structure which is mounted on the array substrate 111 to apply the gate signal for driving the thin film transistor and the data driving unit for applying the date signal to the pixel electrode may be mounted within the driving IC 115. The main circuit board 116 is made of a flexible material and is electrically connected to the external system and the power supply. Further, polarizing plates may be attached at the both outsides of the attached array substrate 111 and color filter substrate 112 to polarize the incident and output lights.

The back light unit 120 includes a LED array 121 which is the light source, the light guide plate 124 for guiding the light from the light source to the liquid crystal display panel 110, and the reflector 126 for reflecting the light outputting through the lower surface of the light guide plate 124 into the inside of the light guide plate 124.

The LED array 121 comprises a plurality of LED packages 122 and a LED substrate 123 on which the plurality of LED packages 122 are arranged in one direction thereon. R, G, and B-LED packages for emitting R, G, and B monochromatic lights or W (White) LED package for emitting the white light may be used as the LED package 122. For example, the LED packages can be light emitting diode packages each having a plurality of light emitting diodes.

The LED substrate 123 is disposed at the one side of the inside of the mould frame 130 so that the emitting surface of the LED package 122 arranged in one direction thereon is facing to the light incident surface of the light guide plate 124. Not shown in figure, conductive lines connected electrically to the LED packages 122 are disposed on the LED substrate 123 so that the external signal is applied to the LED package 122 to emit light from the LED package 122.

The light guide plate 124 is disposed at the lower portion of the liquid crystal display panel 110 to guide the light from the LED package 122 into the liquid crystal display panel 110. The light from the LED package is inputted into the inside of the light guide plate 124 through the side surface, that is, light incident surface, and then outputted through the upper surface of the light guide plate 124 after the light is reached to the other side surface by reflecting at the upper and lower surfaces.

The light guide plate 124 can be formed in the rectangular parallelepiped shape. The light guide plate 124 is made of at least one material selected from the group consisting of a PMMA (Polymethyl-Methacrylate), a glass, and a PET (Polyethylene terephthalate). On the lower surface of the light guide plate 124, intaglio patterns or embossing patterns can be formed to reflect the light incident to the lower surface toward the upper surface.

The light inputted into the inner side of the light guide plate 124 through the light incident surface thereof is reflected at the upper and lower surfaces and then passing toward the side surface opposing the light incident surface. The light incident to the upper surface of the light guide plate 124 in the incident angle more than the critical angle for the perpendicular line of the upper surface is totally reflected at the upper surface toward the inner portion of the light guide plate 124 to propagate through the inner portion. The light incident to the upper surface of the light guide plate 124 in the incident angle less than the critical angle fort the perpendicular line of the upper surface is outputted through the upper surface to supply the light into the liquid crystal display panel 110.

The optical sheets 125 over the light guide plate 124 improves the optical efficiency of the light which is output from the light guide plate 124 and the light from the optical sheets 124 is supplied to the liquid crystal display panel 110. The optical sheets 125 include the diffusion sheet for diffusing the light from the light guide plate 124 and the first and second prism sheets for condensing the diffused light to supply the light having uniform brightness into the liquid crystal display panel 110. At that time, the diffusing sheet includes only one sheet and the prism sheets include a first prism sheet and a second prism sheet to be crossed vertically for each other in the x and y directions to improve the straight propagate property of the light by refracting the incident light.

On the lower surface of the light guide plate 124, the reflector 126 is disposed to reflect the light outputted through the lower surface of the light guide plate 124 into the inner portion of the light guide plate 124.

The liquid crystal display panel 110 and the back light unit 120 are coupled by the mould frame 130. As shown in figure, the mould frame 130 is formed in the rectangular framework. The LED array 121 is disposed at the one side of the mould frame 130 and the liquid crystal display panel 110 is attached on the upper surface of the mould frame 130 by a light blocking tape 145. The light guide plate 124 and the optical sheets 125 are stacked at the inner side of the mould frame 130 and the reflector 126 is attached to the lower surface of the mould frame 130 by an attaching tape (but not shown).

Figure 5A:
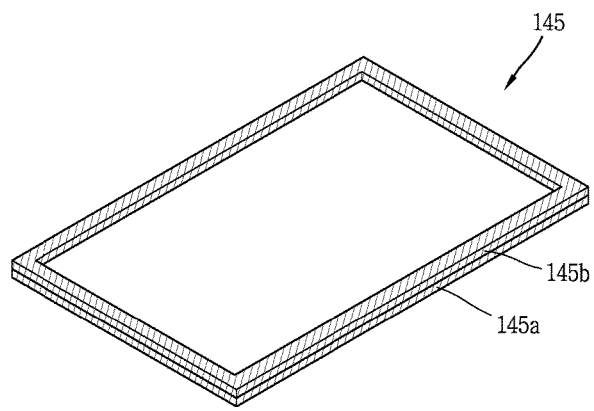
FIGS. 5A and 5B are views illustrating the structure of a light blocking tape according to examples of the invention.
Figure 5B:
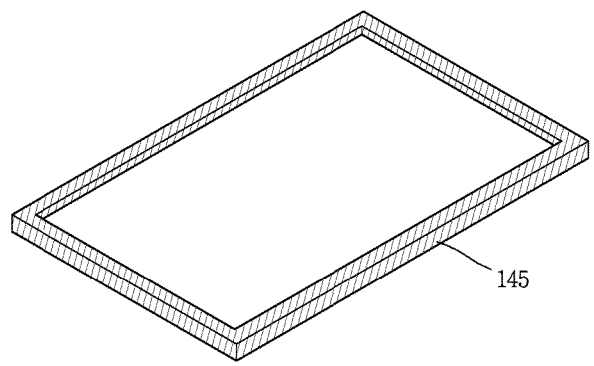

FIGS. 5A and 5B indicates examples of the light blocking tape 145 according to the first embodiment of the invention.

As shown in FIG. 5A, the light blocking tape 145 comprises a first light blocking tape 145a and a second light blocking tape 145b attached to the upper surface of the first light blocking tape 145a. The first light blocking tape 145a has the shape and width same as the second light blocking tape 145b, so that the first light blocking tape 14a is attached to the upper surface of the mould frame 130 and the second light blocking tape 145b is attached to the upper surface of the first light blocking tape 145a.

At that time, each of the first and second light blocking tapes 145a and 145b are black tape and the reason for black tape is as follow.

In general, the light blocking tape 145 blocks the light leaked through the boundary area of the light blocking tape 145 and the optical sheets 125. However, it is impossible to block perfectly the light so that a part of the light is leaked through this area. In case where the first light blocking tape 145a is white tape, the light incident to the first light blocking tape 145a is reflected on the white surface of the first light blocking tape 145a and then the reflected light is leaked to the outer portion through the boundary area between the light blocking tape 145 and the optical sheets 125, when the light is incident to the boundary area between the light blocking tape 145 and the optical sheets 125.

Therefore, when the white tape is used as the first light blocking tape 145a, the brightness at the edge of the screen is higher than that at the central portion of the screen so that the bright line is occurred at the edge of the screen.

Since the black tape is used as the first and second light blocking tapes 145a and 145b, in this example of the invention, the light incident to the first light blocking tape 145a is absorbed by the black to minimize the leakage of the light through the boundary area between the light blocking tape 145 and the optical sheets 125, in case where the light is not perfectly blocked by the light blocking tape 145. As a result, the bright line is not occurred at the edge of the screen.

As shown in FIG. 5B, the light blocking tape 145 may be comprises only one tape. In this case, since the whole of the light blocking tape 145 is black material, it is not necessary to attach two light blocking tapes for each other. Thus, the fabrication cost may be down.

However, when one light blocking tape 145 is totally black, the bright line at the edges of the screen caused by the increase of the brightness can be prevented, whereas the edge of the screen at the portion that the LED array 121 is disposed, that is, the edge corresponding to the light incident surface of the light guide plate 124 has the brightness lower than that at the other edges of the screen, thereby the brightness at the edge corresponding to the light incident surface of the light guide plate 124 is more dim than at the central region of the screen.

In other word, if the light blocking tape 145 having the lower surface of black is used, the problem of the bright line at the 3 edges except the edge corresponding to the light incident surface can be solved, but other problem that the edge corresponding to the light incident surface of the light guide plate 124 is dimed is issued.

This is caused by the structural features of the light guide plate 124 and the LED array 121. The LED array 121 is facing to the light incident surface of the light guide plate 124 so that the light is inputted to the inside of light plate guide 124 through the light incident surface. At this time, the light inputted through the light incident surface of the light guide plate 124 is refracted at the light incident surface toward the upper surface or the lower surface. The light incident at the upper surface in the incident angle larger than the critical angle is totally reflected at the upper surface toward the inner portion to propagate within the light guide plate 124, but the light incident at the upper surface in the incident angle less than the critical angle is outputted through the upper surface to be supplied to the liquid crystal display panel 110.

However, the light inputted through the light incident surface is refracted at the light incident surface and then the refracted light is reached to the upper surface of the light guide plate 124, so that amount of the light reached at the region apart from the light incident surface in the distance more than a certain distance is larger than that of the region neighboring to the light incident surface. Thus, the brightness at the edge neighboring to the light incident surface is less than that at other three edges. When the lower surface of the light blocking tape 145 is white, the brightness at the 4 edges of the liquid crystal display panel 110 is higher than that at the central region of the liquid crystal display panel 110 so that the bright lines are occurred in four edges. However, if the light blocking tape 145 is black, since the brightness of all the edges of the liquid crystal display panel 110 can be decreased, the brightness at three edges except the edge corresponding to the light incident surface is same as the brightness at the central region of the liquid crystal display panel 110 and the brightness at the edge corresponding to the light incident surface is less than that at the central region of the liquid crystal display panel 110.

In order to solve this problem, in this invention, the mould frame 103 is made of the white material and an extension unit is introduced to the mould frame 130. Where, the mould frame 130 may be formed by injecting the white synthetic resins with the injection moulding process.

As shown in FIG. 4, the mould frame 130 includes a body 131 of a square shaped framework and an extension unit 132 extended from the upper surface of the body 131. The back light unit 120 is disposed at the inner side of the body 131 and the liquid crystal display panel 110 is disposed at the upper surface of the body 131, thereby the liquid crystal display panel 110 is coupled with the black light unit 120.

The light guide plate 124 is disposed at the inner side surrounded by the square shaped framework of the mould frame 130 and the LED array 121 is disposed at the region between the light incident surface of the light guide plate 124 and the one side surface of the mould frame 130. The LED array 121 includes a plurality of LED packages 122 and the LED substrate 123 on which the LED packages are arranged in the longitudinal direction thereof. The LED substrate 123 on which a plurality of LED packages 122 are mounted is inserted to the mould frame 130 from the lower direction of the mould frame 130 and then coupled with the mould frame 130 so that the lower surface of the mould frame 130 is contacted with the LED package mounting surface of the LED substrate 123 and the LED package 122 is disposed in the LED mounting unit 131a of the mould frame 130.

The extension unit 132 is extended from the upper surface of the body toward the upper portion of the light guide plate 124 in certain thickness to cover a part of the LED package 122 and the light guide plate 124. The extension unit 132 may be formed integrally and separately from the body 131. When the extension unit 132 is formed integrally with the body 131, the extension unit 132 is made of the white resin since the body 131 is made of the white resin. When the extension unit 132 is formed separately from the body 131, further, the extension unit 132 is also made of the white resin.

Since the extension unit 132 covers the upper region of the LED package 122 and the upper region of the light guide plate 124 neighboring to the light incident surface thereof, a part of the light from the LED package 122, that is, the light incident to the upper surface of the LED package 122, the light incident to the upper portion of the space between the LED package 122 and the light guide plate 124, and the light outputted from the upper surface neighboring to the light incident surface of the light guide plate 124 are reflected by the extension unit 132, while the rest of the light is incident and passing within the light guide plate 124.

As described above, since the light blocking tape 145 has the black lower surface and the light incident to the lower surface of the light blocking tape 145 is absorbed by the black surface, in this invention, the bright line is not occurred at the edges of the screen, but the edge neighboring to the light incident surface is dimed by the light absorption. However, since the extension unit 132 of the mould frame 130 is white, a part of the light incident to the black light blocking tape 145 is reflected by the white extension unit 132, thereby the brightness at the edge neighboring to the light incident surface can be improved.

Figure 1:
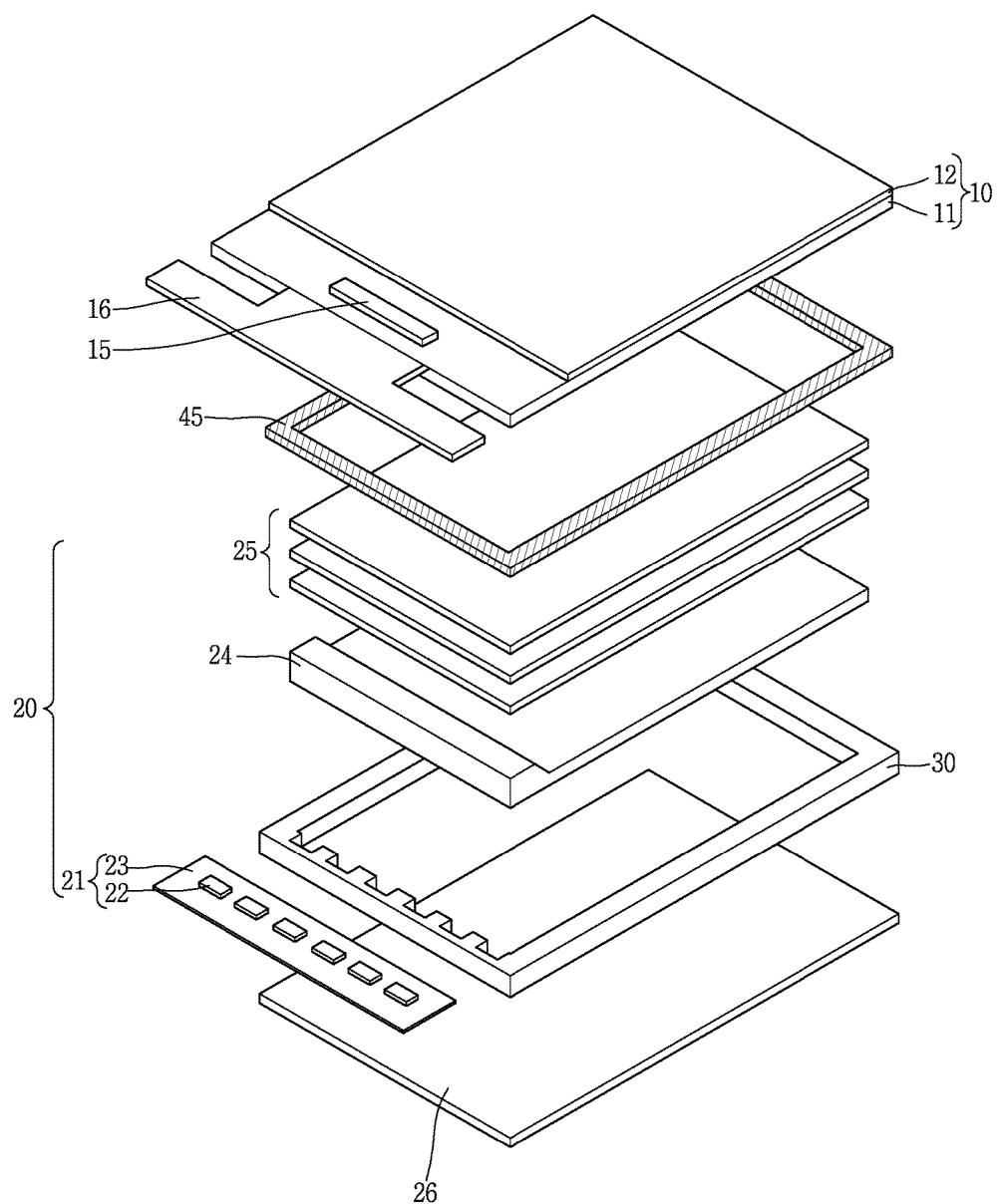
FIG. 1 is an exploded perspective view illustrating a structure of a liquid crystal display module according to the related art.
Figure 2:
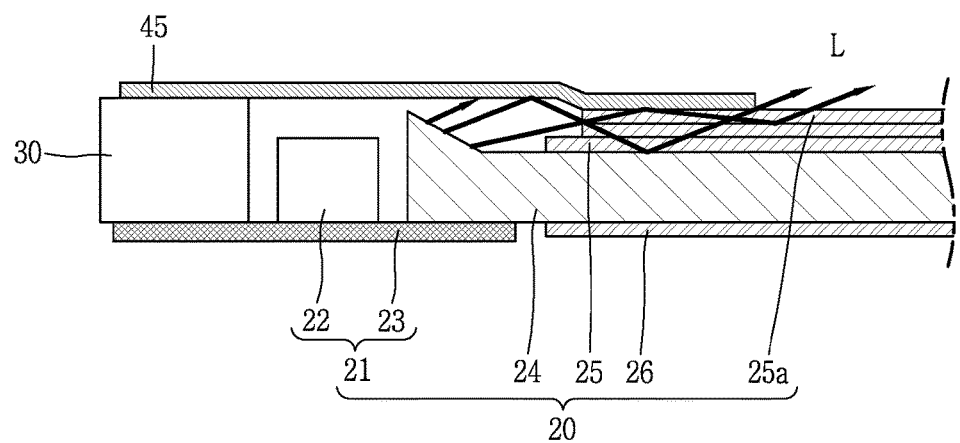
FIG. 2 is a cross sectional view of the coupled liquid crystal display module according to the related art.

The thickness of the light incident surface of the light guide plate 124 is larger than that of opposing end portion. Thus, the thickness is gradually decreased as go to the central region from the light incident surface of the light guide plate 124, so the inclined surface is formed at the upper surface of the light guide plate 124. The extension unit 132 is disposed at the upper portion of the inclined surface of the light guide plate 124. As shown in FIG. 2, the light inputted to the inside of the light guide plate 124 through the light incident surface is refracted at the light incident surface and then the refracted light is incident to the inclined surface of the light guide plate 124 in the incident angle less than the critical angle so that the light is outputted through the inclined surface. The extension unit 132 reflects the light outputted from the inclined surface of the light guide plate 124 to prevent the decrease of the brightness at the edge neighboring to the light incident surface. A part of the extension unit 132 is disposed over the inclined surface of the light guide plate 124 and inclined in a certain angle along the inclined surface of the light guide plate 124. Since the part of the extension unit 132 is inclined, the amount of the light reflected from the extension unit 132 toward the region between the light blocking tape 145 and the optical sheets may be controlled. That is, in this invention, the mould frame 130 has the extension unit 132 to improve the brightness at the edge corresponding to the light incident surface of the light guide plate 124 and the extension unit 132 is inclined to control the brightness at the edges.

When the brightness at the edge corresponding to the light incident surface of the light guide plate 124 is increased by the white extension unit 132, the light may be strongly reflected a the white extension unit 132 and thus the reflected light may be leaked to the liquid crystal display panel 110. As a result, the brightness at the edge corresponding to the light incident surface of the light guide plate 124 is higher than that at the other edges by the excessive amount of the reflected light so that another bright line may be occurred at the edge corresponding to the light incident surface of the light guide plate 124.

In this invention, the inclined surface of the extension unit 132 controls the amount of the light which is reflected from the extension unit 132 and inputted to the liquid crystal display panel 110, so that the brightness at the edge corresponding to the light incident surface is same as the brightness at other edges and central region, thereby the brightness is uniform in the whole area of the screen.

As described above, in this invention, since the extension unit 132 of the mould frame 130 controls the amount of the light incident to the boundary area between the light blocking tape 145 and the optical sheets 125 to control the brightness at the edge corresponding to the light incident surface of the light guide plate 124, the extension unit 132 may be called a brightness controlling unit of the edge corresponding to the light incident surface.

Figure 6A:
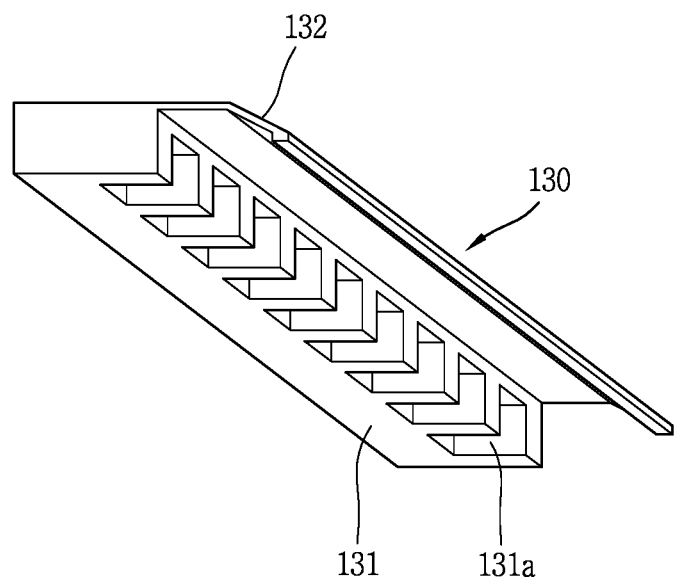
FIGS. 6A and 6B are views illustrating the structure of a mould frame according to an example of the invention.
Figure 6B:
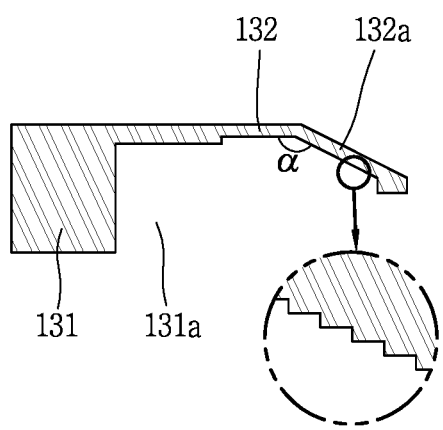

FIGS. 6A and 6B are views showing an example of the mould frame 130 according to an embodiment of the invention, where FIG. 6A is a rear perspective view and FIG. 6B is a cross sectional view.

As shown in FIG. 6A, the mould frame 130 includes the body 131 and the extension unit 132. The extension unit 132 may be formed integrally or separately from the body 131. The light blocking tape 145 is attached on the upper surface of the body 131 and the liquid crystal display panel 110 is supported by the upper surface to couple the liquid crystal display module. A plurality of LED mounting units 131a which are formed in the groove shape having opening facing to the light incident surface of the light guide plate 124 are formed in the body 131 to mount the LED package 122 in each LED mounting unit 131a. Where the neighboring LED mounting units 131a are separated from each other by the body 131. Only the region facing to the light incident surface of the light guide plate 124 is opened and the light is incident to the light guide plate 124 through the opened region.

The extension unit 132 is extended toward the inclined surface of the light guide plate 124 from the upper surface of the body 131. As shown in FIG. 6B, at the end portion of the extension unit 132, an inclined surface 132a is formed in a certain angel α.

The extension unit 132 reflects the light from the LED package 122 toward the boundary area between the light blocking tape 145 and the optical sheets 125 to identify the brightness at the edge neighboring to the light incident surface of the light guide plate 124 with the brightness at the other edges, and the inclined surface 132a controls the amount of the light inputted to the liquid crystal display panel 110 by varying the reflecting angle of the light incident thereto. If the inclined surface 132a is not formed in the extension unit 132, most of the light reflected from the extension unit 132 is supplied to the liquid crystal display panel 110. However, since the incline surface 132a is partially blocked the light incident to the liquid crystal display panel 110, in this invention, the amount of the light supplied to the liquid crystal display panel 110 can be controlled. Since the amount of the light is controlled by controlling the incline angle α of inclined surface 132a, the brightness at the edge neighboring to the light incident surface of the light guide plate 124 can be also controlled by controlling the incline angle α of inclined surface 132a.

Since the amount of the light reflected at the extension unit 132 and then inputted to the liquid crystal display panel 110 is controlled by the inclined surface 132a, the gradient of the inclined surface 132a is increased as the incline angle α of the inclined surface 132a is decreased so that the amount of the light incident to the edge neighboring to the light incident surface of the light guide plate 124 is decrease and then the brightness at this region is also decreased. The amount of the light incident to the edge neighboring to the light incident surface of the light guide plate 124 is increased as the incline angle α of the inclined surface 132a is increased so that the brightness at this region is increased.

The incline angle α of the inclined surface 132a of the mould frame 130 is dependent upon the length of the inclined surface of the light guide plate 124, the length of the extension unit 132a for reflecting the incident light, and the length of the light blocking tape 145 for blocking the incident light.

As shown in FIG. 6B, on the other hand, the upper surface of the inclined surface 132a may be formed in straight shape or curved shape, and the lower surface of the inclined surface 132a may include a plurality of steps. The lower surface of the inclined surface 132a is the surface onto which the light outputted through the inclined surface of the light guide plate 124 is incident. Since the lower surface of the inclined surface 132a includes the plurality of steps, thus, a part of the light incident thereto (light which should be blocked) is perfectly blocked by the steps. As a result, the amount of the light reflected at the lower surface of the inclined surface 132a and then supplied to the liquid crystal display panel 110 can be controlled more precisely.

Figure 7A:
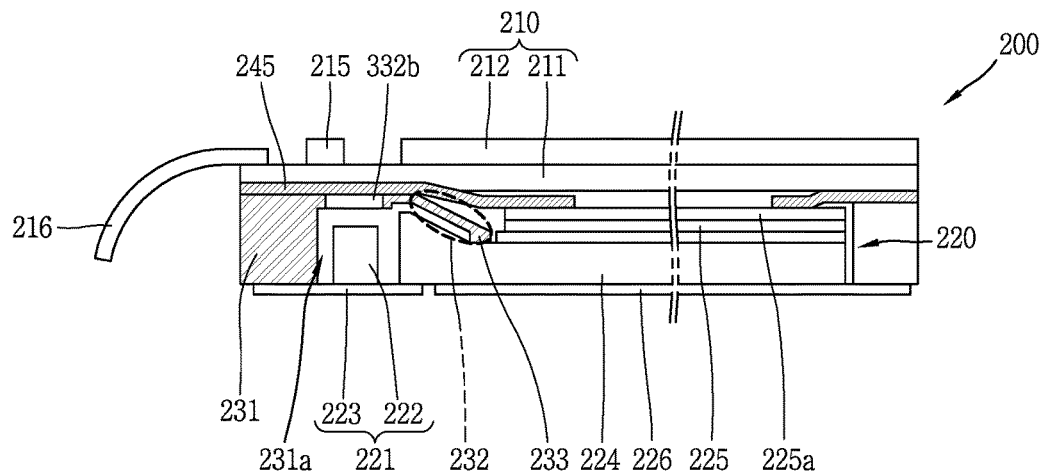
FIGS. 7A and 7B are cross sectional views of a liquid crystal display module according to a second embodiment of the invention.
Figure 7B:
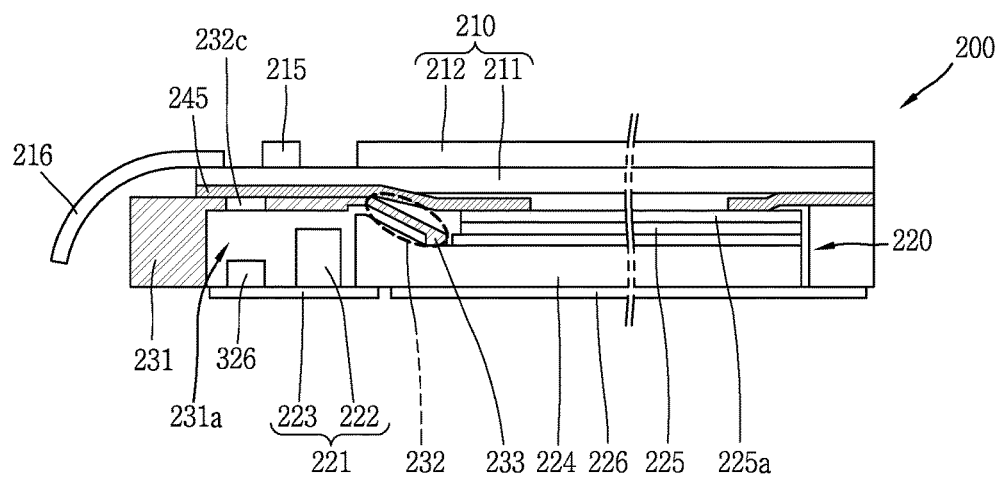

FIGS. 7A and 7B are views illustrating a liquid crystal display module according to a second embodiment of the invention. Where we will skip the detailed description for the element same as the first embodiment and describe only the element different from the first embodiment.

As shown in FIG. 7A, in this embodiment, a plurality of windows 232b are formed in the extension unit 232 of the body 231 of the mould frame 230 and each of the windows 232b is correspondent to the each of the LED packages 222. Since the window 232b is disposed at the upper portion of the LED package 222, the portion facing to the light incident surface of the light guide plate 124 and the upper portion are opened in the body 231 of the mould frame 230.

As described above, in this embodiment, the LED package 222 is not interfered with the mould frame 230 when the LED array 221 is coupled with the mould frame 230 by the first window 232b in the body 231 above the LED package 222. Thus, the area of the first window 232b is larger than the area of the upper surface of the LED package 222 so that the LED package 222 having height higher than the body 231 of the mould frame 230 is protruded through the first window 232b and thus LED package is not collided to the extension unit 232 of the mould frame 230 when the LED array is coupled with the mould frame 230. In other word, in this embodiment, the LED packages 222 having various heights (i.e., heights higher and lower than the body 231 of the mould frame 230) can be coupled with the mould frame 230 by the first window 232b.

As shown in FIG. 7B, LED package 222 is mounted on the LED substrate 223 and then coupled with the mould frame 230 in this embodiment. Where, the LED package 222 is facing to the light incident surface of the light guide plate 224 so that the light from the LED package 222 is inputted to the inside of the light guide plate 224 through the light incident surface. On the LED substrate 223, for example, various electronic elements may be mounted at area between the mould frame 230 and the LED package 222 on the LED substrate 223.

As shown in FIG. 7B, the various electronic elements 236 including the LED package 222 are mounted on the LED substrate in this embodiment, whereas only the LED package 222 is mounted on the LED substrate 223 in the first embodiment. The element 236 includes the various elements for applying the signal to LED package 222. In the extension unit 232 of the mould frame 230 over the element 236, a plurality of second windows 232c are provided. When the LED array 221 is coupled with the mould frame 230, the element 236 is not interfered with the mould frame 230 by the second window 232c. Thus, the area of the second window 232c is larger than the area of the upper surface of the various elements 236 so that the element 236 having height higher than the body 231 of the mould frame 230 is protruded through the second window 232c and thus the element 236 is not collided to the mould frame 230 when the LED array 221 is coupled with the mould frame 230.

Only one of the first and second windows 22 is provided in each of FIGS. 7A and 7B. However, all of the first and second windows 232b and 232c are provided, so that the LED package 222 and the electronic element 236 are not collided with the mould frame 230 when the LED array 221 is coupled with the mould frame 230. Thus, in this embodiment, the LED package 222 and the elements having the various size and height may be mounted on the LED substrate 223 which is coupled with the mould frame 230.

Figure 8:
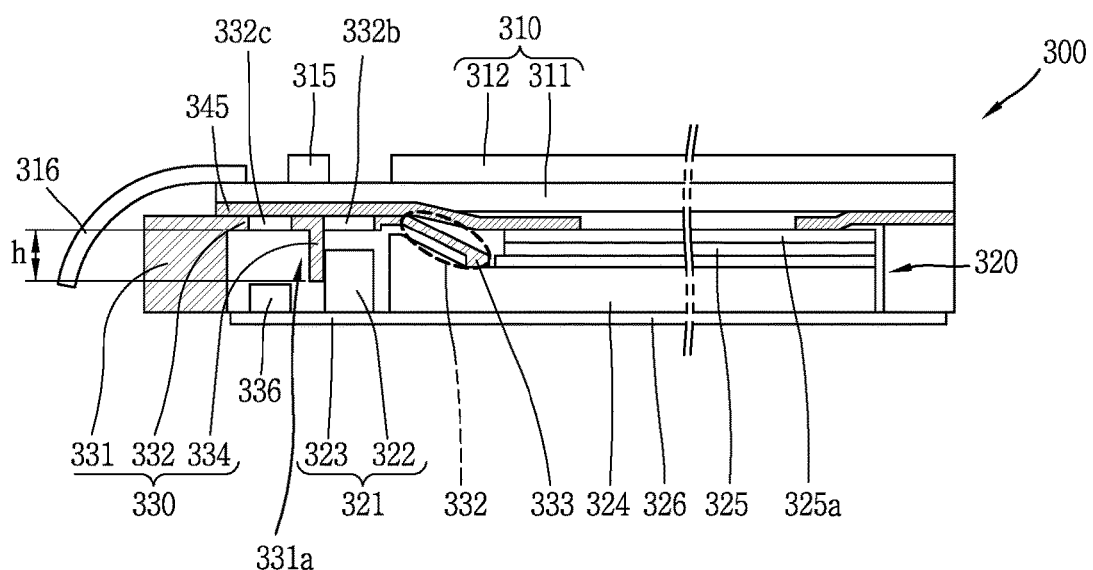
FIG. 8 is a cross sectional view of a liquid crystal display module according to a third embodiment of the invention.

FIG. 8 is a view showing the structure of a liquid crystal display module according to a third embodiment of the invention.

As shown in FIG. 8, the liquid crystal display module of this embodiment comprises the liquid crystal display panel 310, the back light unit 320 at the rear portion of the liquid crystal display panel 310 to supply the light to the liquid crystal display panel 310, and the mould frame 330 for coupling the liquid crystal display panel 310 and the back light unit 320.

The back light unit 320 includes the LED array 321, the light guide plate 324 for guiding the light from the LED array 321 into the liquid crystal display panel 310, the optical sheets 325 above the light guide plate 324 to improve the optical efficiency of the light supplied to the liquid crystal display panel 310, and the reflector 326 for reflecting the light outputted through the lower surface of the light guide plate 324 into the light guide plate 324.

LED array 321 includes a plurality of LED packages 322 and the LED substrate 323 on which the LED packages 322 are mounted along one direction. A plurality of LED packages 322 are arranged on the upper surface of the LED substrate in the longitudinal direction thereof and the LED substrate 323 is disposed at one side of the light guide plate 324 such that the emitting surface of the LED package 322 is facing to the light incident surface of the light guide plate 324.

The optical sheets above the light guide plate 324 improves the optical efficiency of the light outputted from the light guide plate 324 and then the light having good optical efficiency is supplied to the liquid crystal display panel 310. At the rear portion, the reflector 326 is disposed to reflect the light output thorough lower surface of the light guide plate 324 into the light guide plate 324.

The liquid crystal display panel 310 and the back light unit 320 are coupled for each other by the mould frame 330. As shown in figure, the mould frame 330 is formed in the rectangular framework. The LED array 321 is disposed at the one side of the mould frame 330 and the liquid crystal display panel 310 is attached on the upper surface of the mould frame 330 by the light blocking tape 345. The light guide plate 324 and the optical sheets 325 are stacked at the inner side of the mould frame 330 and the reflector 326 is attached to the lower surface of the mould frame 330.

The mould frame 330 comprises the body 331 for supporting the liquid crystal display panel 310, the extension unit 332 extended from the upper surface of the body 331 to reflect the light from the LED package 322, and a LED fixing unit 334 extruded from the extension unit 332 to the lower direction of the extension unit 332 to fix the LED package 322.

The mould frame 330 of this embodiment has the same structure as the first and second embodiments. Thus, the light blocking tape 345 made of one black tape or two black tapes is attached on the upper surface of the mould frame 330 to block the light supplied directly to the liquid crystal display panel 310 from the LED package 322. The inclined surface is formed at the end portion of the extension unit 332 to control the amount of light incident to the boundary area between the light blocking tape 345 and the optical sheets 325, thereby the brightness at the edge neighboring to the light incident surface of the light guide plate 324 can be identified with brightness at other edges.

The first and second windows 332c and 332d are formed in the extension unit 332 of the mould frame 330, so that the LED array 321 and the electronic elements 336 are not collided with the mould frame 330, when the LED array 321 and the electronic elements 336 are mounted on the LED substrate 323.

The LED fixing unit 334 of the mould frame 330 is to prevent that the LED package 322 is disposed in the undesirable position, when the LED array 321 is assembled. This structure will be described as follow.

Figure 9:
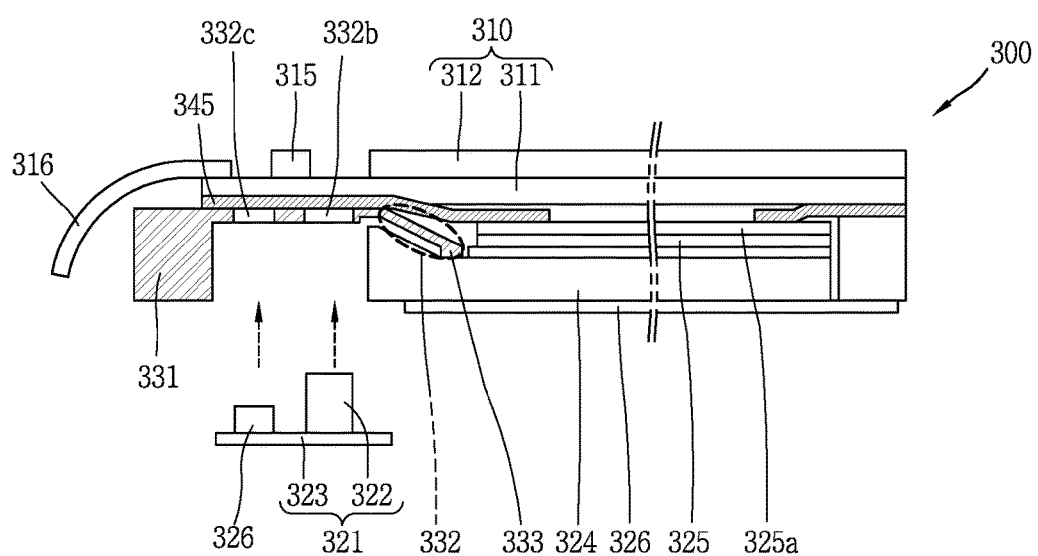
FIG. 9 is a view illustrating a method of coupling a LED array according to the third embodiment of the invention.

FIG. 9 is a view illustrating the assembly of the liquid crystal display module in this embodiment.

First, as shown in FIG. 9, the liquid crystal display panel 310 is disposed on the upper surface of the mould frame 330 and the liquid crystal display panel 310 is attached to mould frame 330 by the light blocking tape 345. At the inner side of the body 331 of the mould frame 330, the optical sheets 325 and the light guide plate 324 are stacked.

Thereafter, the LED package 322 and various elements 336 are mounted on the LED substrate 323 to form the LED array 321 and then the LED array 321 is inserted into the LED mounting unit of the mould frame 330 from the lower direction by an operator to couple the LED array to the mould frame 330.

Since the LED array 321 is inserted into the LED mounting unit of the mould frame 330 by the operator in a manual work, the LED package 322 is not positioned at the set position, when the assembling error is generated.

Figure 10:
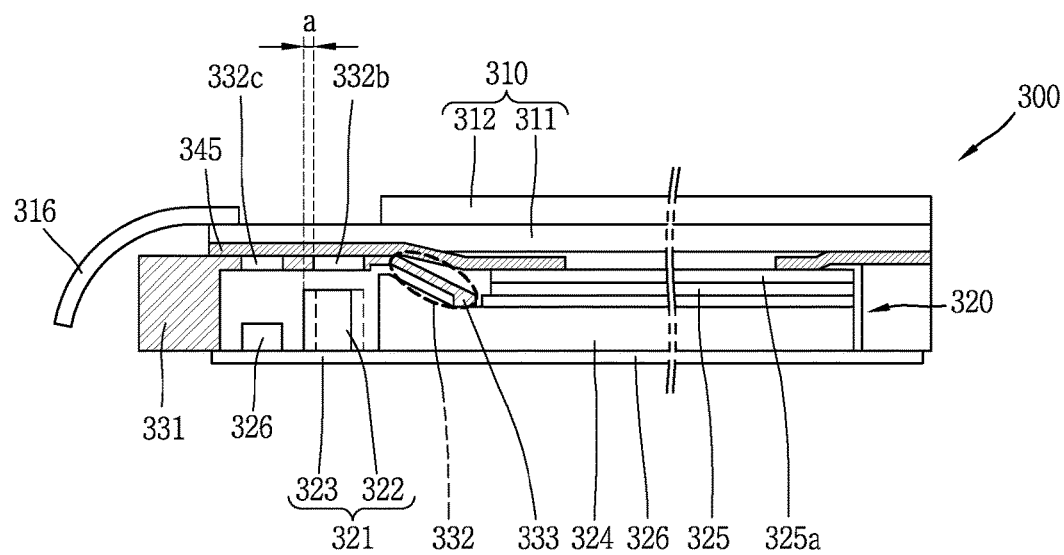
FIG. 10 is a view illustrating an assembling error according to the third embodiment of the invention.

FIG. 10 is a view of the liquid crystal display module having the assembling error.

As shown in FIG. 10, when the assembling error is occur, the LED package 322 is disposed at the position (indicated in solid line) apart from set position (indicated in a dot line) in the certain distance (a), so that the distance (x) between the LED package 322 and the light incident surface of the light guide plate 324 is increased. The increase of the distance between the LED package 322 and the light incident surface of the light guide plate 324 causes the decrease of the brightness of the liquid crystal display panel.

Table 1 indicates the brightness of the liquid crystal display panel 310 according to the space distance between the set position and the actual position of the LED package 322 by the assembling error when the LED package 322 is coupled.

TABLE 1

| space distance by assembling error | brightness (%) |
|---|---|
| 0.0 mm | 100% |
| 0.1 mm | 95% |
| 0.2 mm | 85% |

As shown in Table 1, the brightness of the liquid crystal display panel is 100% when the LED package 322 is disposed at the set position. If the LED package 322 is apart from set position in 0.1 mm by the assembling error, the brightness is 95%. If the LED package 322 is apart from set position in 0.2 mm by the assembling error, the brightness is 85%. In other word, 5% of the brightness is decreased if the LED package 322 is apart from set position in 0.1 mm and 15% of the brightness is decreased ff the LED package 322 is apart from set position in 0.2 mm, so that the brightness is exponentially decreased as increasing the space distance by the assembling error, thereby the image quality of the liquid crystal display module may be deteriorated.

In this embodiment, in order to prevent badness caused by the assembling error, LED fixing unit 334 extended to the lower portion from the extension unit 332 of the mould frame 330 is provided. The LED fixing unit 334 is a stopper that stops the LED array 321 to move from the set position by the assembling error when the LED array 321 is coupled, so that LED is always disposed at the set position. Further, the LED array 321 is not moved by the impact applied from the outer portion by the LED fixing unit 334 after coupling the LED array 321.

The LED fixing unit 334 is formed in the certain height (h) so that the LED fixing 334 is contacted with one side of the LED package 322 to prevent the movement of the LED package 322. However, the shape of the LED fixing unit 334 is not limited to the particular shape. For example, the LED fixing unit 334 may be continuously extended to one side from other side of the extension unit 332 of the mould frame 330 along the longitudinal direction of the LED substrate 223. Further, a plurality of LED fixing units 334 may be disposed in the extension unit 3332 of the mould frame 330 at the certain interval along the longitudinal direction of the LED substrate 323. Specially, since the LED fixing unit 334 is contacted with the LED package 322 to stop the movement of the LED package 322 in this invention, the LED package 334 can be formed in the various shapes if the LED package 334 can be stopped. For example, the LED fixing unit 334 may be comprised a plurality of bars having the certain width to stop the LED package 322. At this time, the number of the LED fixing units 334 is same as the number of the LED packages 322 so that each of the LED fixing units 334 having bar shape is contacted with the corresponding LED package 312 to prevent the movement the corresponding LED package 322.

As described, in case of LED fixing unit 334 of the bar shape, the section of the LED fixing unit 334 may be square, rectangular, circular, or elliptical. Further, the length of the LED fixing unit can be set to contact the LED fixing unit 334 with the LED substrate 334 and set to be apart the LED fixing unit 334 from the LED fixing unit in the uniform distance. Since the LED fixing unit 334 should be contacted with the LED package 322, the length of the LED fixing unit 334 should be larger than the distance between the extension unit 332 of the mould frame 330 and the LED package 322.

Figure 11:
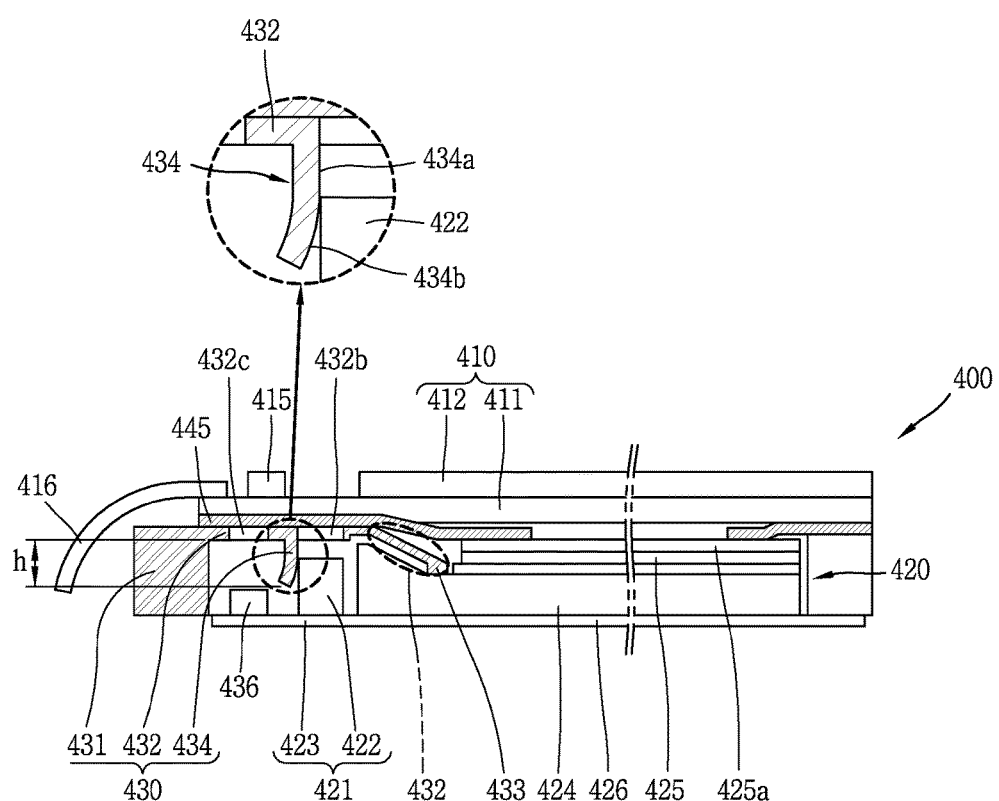
FIG. 11 is a cross sectional view of a liquid crystal display module according to a fourth embodiment of the invention.

FIG. 11 is a view showing a liquid crystal display module according to a fourth embodiment of the invention. The structure of this embodiment is similar with the structure of the third embodiment, so that the description for the same structure will be omitted or brief and the different structure will be described in detail.

As shown in FIG. 11, in this liquid crystal display module, the LED fixing unit 434 acts as a fixing means for preventing the movement of the LED package 422 caused by the assembling error and a guide means for guiding the LED array 421 when the LED array 421 is coupled.

As shown in figure, the LED fixing unit 434 includes a fixing member 434a and a guide member 434b. When the LED array 421 is coupled, the movement of the LED array 421 is stopped by the fixing member 434a so that the LED package 422 is always disposed in the set position and the LED package 422 is not moved by the impact. Further, the guide member 434b guides the LED array 421 from the position disposed by the assembling error to the set position when the LED array 421 is coupled.

The fixing member 434a is extended from the extension unit 432 of the mould frame 430 to the lower portion. Where the fixing member 434*a* can be integrally formed with the extension unit 432 of the mould frame 430 with the same material and separately formed with the extension unit 432 of the mould frame 430 with the different material. That is, the fixing member 434*a* can be made of the white resin. However, the fixing member 434*a* can be made of the various materials. The fixing member 434*a* is vertically disposed to the extension unit 432 of the mould frame 340 so that the fixing member 434*a* is contacted with the side surface of the LED package 422.

The guide member 434*b* is formed in the curved surface having a certain curvature and extended from the end portion of the fixing member 434*a*. At that time, the guide member 434*b* can be integrally formed with the fixing member 434*a* in the same material. However, the guide member 434*b* is attached with the material different from the fixing member 434*a* and the guide member 434*b* is attached to the fixing member 434*a*.

The curved surface having the certain curvature of the guide member 434*b* guides the LED package 422 to the set position when the LED array 421 is coupled. This is described in detail as follow.

Figure 12A:
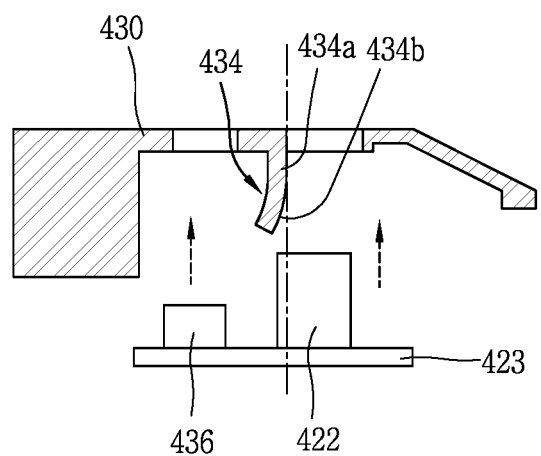
FIGS. 12A and 12B are views illustrating a method of coupling a LED array according to the fourth embodiment of the invention.
Figure 12B:
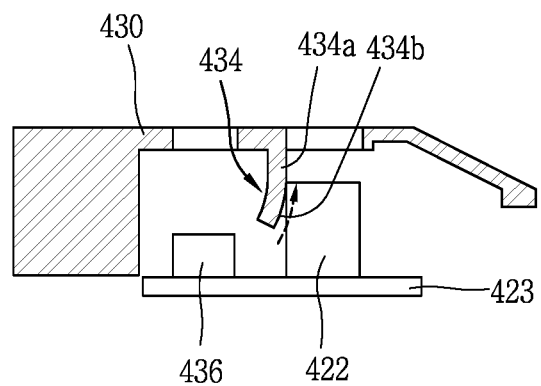

FIGS. 12A and 12B are views showing a method of coupling the LED array with the liquid crystal display module according to an embodiment of the invention.

As shown in FIG. 12A, after coupling the liquid crystal display panel 410 and the back light unit 420, the LED array 421 is inserted to the mould frame 430 from the lower direction of the liquid crystal display panel by the operator in a manual work. Where, the LED package 422 of the LED array 421 is mounted in the LED mounting unit of the mould frame 430 (referring to FIGS. 6A and 6B).

Since the liquid crystal display panel 410 and the back light unit 420 is coupled by the operator in the manual work, the assembling error is occurred and the LED array 421 is not exactly aligned with the LED mounting unit of the mould frame 430. Therefore, when the LED package 422 is inserted in the LED mounting unit of the mould frame 430, the LED package 422 is inserted to the position deviated from the set position, thereby the assembling error is occurred. In particular, since the LED package 422 is disposed at the region near the light incident surface of the light guide plate 424, the assembling error is occurred in the direction away from the light incident surface of the light guide plate 424 when the LED package 422 is coupled. In case where the assembling error is occurred in the direction close to the light incident surface of the light guide plate 424, the LED package 422 is not coupled with the mould frame 430. Thus the assembling error is occurred in the direction away from the light incident surface of the light guide plate 424.

Since the guide member 434*b* is formed at the fixing member 434*a*, in this invention, the guide member 434*b* guides the LED array 421 to the set position and thus the LED package 422 is always disposed in the set position when the assembling error occurred.

The guide member 434*b* is extended from the fixing member 434*a* and curved in the direction away from the light guide plate 424. That is, the guide member 434*b* is curved to the body of the mould frame 430. When the assembling error is not occurred at the assembling process and the LED array 421 is disposed at the set position, the LED package 422 is directly inserted to the LED mounting unit without contacting with the guide member 434*b* and thus the side surface of the LED package 422 is contacted with the fixing member 434*a* of the LED fixing unit 434.

If the assembling error occurs during assembling the LED array 421, that is, if the assembling error occurs in the direction away from the light incident surface of the light guide plate 424, the LED package 422 may not be directly inserted into the LED mounting unit and touched with the guide member 434*b* of the LED fixing unit 434.

As shown in FIG. 12B, the LED package 422 contacted with the guide member 434*b* of the LED fixing unit 434 is sliding along the curved surface of the guide member 422 to be inserted the LED mounting unit so that the LED package 422 is coupled to the mould frame 430 and the side of the LED package 422 is contacted with the fixing member 434*a* of the LED fixing unit 434.

If the assembling error is within the range of the curved surface of the guide member 434*b*, since the LED package 422 is sliding along the curved surface of the guide member 434*b* to be disposed at the set position when the LED package 422 is coupled, the assembling error can be cured. That this time, the range curing the assembling error is dependent upon the length and the curvature of the guide member 434*b* of the LED fixing unit 434 for guiding the LED package 422.

As described above, in this embodiment, the LED fixing unit 434 includes the guide member 434*b* so that the badness caused by the assembling error can be prevented Further, since the movement of the LED package 422 is prevented by the fixing member 434*a* of the fixing unit 434, the LED package 422 does not deviate from the set position.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mould frame of a liquid crystal display module, the mould frame comprising:
    a body for coupling a liquid crystal display panel and a back light unit including a light emitting device (LED) array having a plurality of LED packages thereon; and
    an extension unit extended from an upper surface of the body to cover a light source of the back light unit, at least a portion of the extension unit having a first inclined portion for reflecting light from the light source to control an amount of the light supplied to the liquid crystal display panel,
    wherein a lower surface of the first inclined portion includes a plurality of steps.

2. The mould frame of claim 1, wherein the body includes a mounting unit for mounting each of the plurality of LED packages, the mounting unit having a groove shape.

3. The mould frame of claim 1, wherein the extension unit includes at least one window over at least one of the LED packages or over elements on the LED array, and
    wherein the at least one of the LED packages or the elements on the LED array is exposed by the at least one window.

4. The mould frame of claim 1, further comprising a LED fixing unit extended from the extension unit and contacted with a side of at least one of the LED packages.

5. The mould frame of claim 4, wherein the LED fixing unit includes a guide member extended from an end portion of the LED fixing unit and curved in a direction away from a light guide plate.

6. The mould frame of claim 1, wherein the back light unit includes a light guide plate having a second inclined portion on an upper surface of the light guide plate, and
wherein the lower surface of the first inclined portion of the extension unit is correspondingly disposed on the second inclined portion of the light guide plate.

7. A mould frame of a liquid crystal display module, the mould frame comprising:
a body for coupling a liquid crystal display panel and a back light unit including a light emitting device (LED) array having a plurality of LED packages thereon; and
an extension unit extended from an upper surface of the body to cover a light source of the back light unit,
wherein the extension unit comprises a LED fixing unit extended from the extension unit to contact with one side of the LED package, and a guide member extended from an end portion of the LED fixing unit and curved in a direction away from a light guide plate.

8. The mould frame of claim 7, wherein the LED fixing unit is integrally formed with the body and the extension unit.

9. The mould frame of claim 7, wherein the LED package is guided to a set position by the guide member in a case of occurring an assembling error in a direction away from a light incident surface of the light guide plate when the LED array is coupled.

10. The mould frame of claim 9, wherein the guide member includes a curved surface having a certain curvature.

11. The mould frame of claim 10, wherein the curved surface is bent toward the body.

12. A liquid crystal display module comprising:
a liquid crystal display panel;
a back light unit for supplying light to the liquid crystal display panel in a lower portion of the liquid crystal display panel, the back light unit including a light emitting device (LED) array and a light guide plate; and
a mould frame for coupling the liquid crystal display panel and the back light unit,
wherein the mould frame includes:
a body; and
an extension unit extended from an upper surface of the body to cover a light source of the back light unit, at least a portion of the extension unit having a first inclined portion for reflecting light from the light source to control an amount of the light supplied to the liquid crystal display panel, and
wherein a lower surface of the first inclined portion includes a plurality of steps.

13. The liquid crystal display module of claim 12, wherein the body includes a mounting unit for mounting each of the plurality of LED packages, the mounting unit having a groove shape.

14. The liquid crystal display module of claim 12, wherein the extension unit includes at least one window over at least one of the LED packages or over elements on the LED array, wherein the at least one of the LED packages or the elements on the LED array is exposed by the at least one window.

15. The liquid crystal display module of claim 12, wherein the mould frame further comprises a LED fixing unit extended from the extension unit and contacted with a side of at least one of the LED packages.

16. The liquid crystal display module of claim 15, wherein the LED fixing unit includes a guide member extended from an end portion of the LED fixing unit and curved in a direction away from a light guide plate.

17. The liquid crystal display module of claim 12, wherein the back light unit includes a light guide plate having a second inclined portion on an upper surface of the light guide plate.

18. The liquid crystal display module of claim 12, wherein the lower surface of the first inclined portion of the extension unit is correspondingly disposed on the second inclined portion of the light guide plate.

19. A liquid crystal display module comprising:
a liquid crystal display panel;
a back light unit for supplying light to the liquid crystal display panel in a lower portion of the liquid crystal display panel, the back light unit including a light emitting device (LED) array and a light guide plate; and
a mould frame for coupling the liquid crystal display panel and the back light unit, the mould frame including a body and an extension unit extended from an upper surface of the body to cover a light source of the back light unit,
wherein the extension unit comprises a LED fixing unit extended from the extension unit to contact with one side of the LED package, and a guide member extended from an end portion of the LED fixing unit and curved in a direction away from a light guide plate.

20. The liquid crystal display module of claim 19, wherein the LED fixing unit is integrally formed with the body and the extension unit.

21. The liquid crystal display module of claim 19, wherein the LED package is guided to a set position by the guide member in a case of occurring an assembling error in a direction away from a light incident surface of the light guide plate when the LED array is coupled.

22. The liquid crystal display module of claim 21, wherein the guide member includes a curved surface having a certain curvature.

23. The liquid crystal display module of claim 22, wherein the curved surface is bent toward the body.

24. A liquid crystal display module comprising:
a liquid crystal display panel;
a back light unit for supplying light to the liquid crystal display panel in a lower portion of the liquid crystal display panel, the back light unit including a light emitting device (LED) array and a light guide plate;
a mould frame for coupling the liquid crystal display panel and the back light unit;
a LED fixing unit in an extension unit of the mould frame and contacting a side of a LED package of the LED array; and
a brightness controlling unit in the mould frame to control an amount of light leaked through the liquid crystal display panel,
wherein a first inclined surface disposed at the extension unit is formed to cover a second inclined surface disposed at an upper surface of the light guide plate, and
wherein a lower portion of the first inclined surface includes a plurality of steps, the lower portion of the first inclined surface facing to the second inclined surface.

25. The liquid crystal display module of claim 24, wherein the brightness controlling unit includes an inclined surface extended from the mould frame.

26. The liquid crystal display module of claim 25, wherein the amount of the light leaked through the liquid crystal display panel is controlled by controlling an incline angle of the inclined surface.

* * * * *